(12) United States Patent
Morgan et al.

(10) Patent No.: US 11,878,381 B2
(45) Date of Patent: Jan. 23, 2024

(54) TOOLING BASE ASSEMBLY

(71) Applicant: Mate Precision Technologies Inc., Anoka, MN (US)

(72) Inventors: Christopher Morgan, Minneapolis, MN (US); Patrick Bear, Richfield, MN (US); Steven Flynn, Elk River, MN (US); Joseph Schneider, Elk River, MN (US)

(73) Assignee: Mate Precision Technologies Inc., Anoka, MN (US)

( * ) Notice: Subject to any disclaimer, the term of this patent is extended or adjusted under 35 U.S.C. 154(b) by 216 days.

(21) Appl. No.: 17/396,298

(22) Filed: Aug. 6, 2021

(65) Prior Publication Data

US 2022/0040806 A1 Feb. 10, 2022

Related U.S. Application Data

(60) Provisional application No. 63/061,973, filed on Aug. 6, 2020.

(51) Int. Cl.
*B23Q 1/60* (2006.01)
(52) U.S. Cl.
CPC ..................... *B23Q 1/60* (2013.01)
(58) Field of Classification Search
CPC ...... B23Q 1/0072; B23Q 3/066; B23Q 3/102; B23Q 3/103; B23Q 3/106–108
See application file for complete search history.

(56) References Cited

U.S. PATENT DOCUMENTS

| | | |
|---|---|---|
| 3,948,728 A | 4/1976 | Roeschlau et al. |
| 4,008,127 A | 2/1977 | Gruber et al. |
| 4,144,129 A | 3/1979 | Gruber et al. |
| 4,164,448 A | 8/1979 | Roeschlau et al. |
| 4,168,205 A | 9/1979 | Danninger et al. |
| 4,181,575 A | 1/1980 | Gruber et al. |
| 4,212,938 A | 7/1980 | Gruber et al. |
| 4,366,249 A | 12/1982 | Thum et al. |
| 4,399,218 A | 8/1983 | Gauhl et al. |
| 4,405,445 A | 9/1983 | Kovach et al. |
| 4,406,445 A | 9/1983 | Seidel |
| 4,409,328 A | 10/1983 | Ziegenhorn |
| 4,511,127 A | 4/1985 | Schron et al. |

(Continued)

FOREIGN PATENT DOCUMENTS

| | | |
|---|---|---|
| DE | 102015220810 | 3/2017 |
| EP | 0238734 | 9/1987 |

(Continued)

OTHER PUBLICATIONS

International Search Report and Written Opinion in PCT/US21/45028 dated Nov. 26, 2021.

(Continued)

*Primary Examiner* — Tyrone V Hall, Jr.
(74) *Attorney, Agent, or Firm* — Dicke, Billig & Czaja, PLLC

(57) ABSTRACT

A tooling base assembly for holding a workpiece is disclosed. In one example, the tooling base assembly includes a base assembly and a clamping assembly that imparts an inward radial force towards a center of the base assembly on the workpiece to securely retain and precisely locate the workpiece to the base assembly.

19 Claims, 13 Drawing Sheets

(56) References Cited

U.S. PATENT DOCUMENTS

| | | |
|---|---|---|
| 4,553,847 A | 11/1985 | Lang |
| 4,721,293 A | 1/1988 | Schron et al. |
| RE32,704 E | 6/1988 | Schron et al. |
| 4,863,205 A | 9/1989 | Schron et al. |
| 5,195,227 A * | 3/1993 | Wickham ............ B23Q 1/0063 29/33 P |
| 5,229,286 A | 7/1993 | Jarsch et al. |
| 5,236,837 A | 8/1993 | Beutler et al. |
| 5,308,770 A | 5/1994 | Jarsch et al. |
| 5,523,224 A | 6/1996 | Burtscher et al. |
| 5,617,623 A | 4/1997 | Schron et al. |
| 5,624,811 A | 4/1997 | Lang et al. |
| 5,634,734 A | 6/1997 | Schron et al. |
| 5,679,571 A | 10/1997 | Burtscher et al. |
| 5,720,476 A | 2/1998 | Swann et al. |
| 5,743,576 A | 4/1998 | Schron et al. |
| D409,895 S | 5/1999 | Schron et al. |
| 5,921,534 A | 7/1999 | Swann et al. |
| 5,964,458 A | 10/1999 | Cutsforth et al. |
| 6,046,073 A | 4/2000 | Lang et al. |
| 6,068,310 A | 5/2000 | Fuller et al. |
| 6,109,602 A | 8/2000 | Schron et al. |
| 6,126,159 A | 10/2000 | Dornfeld |
| 6,139,001 A | 10/2000 | Buck |
| 6,161,994 A | 12/2000 | Lang |
| 6,241,231 B1 | 6/2001 | Schron et al. |
| 6,273,686 B1 | 8/2001 | Kroell et al. |
| 6,308,943 B1 | 10/2001 | Fischer et al. |
| 6,386,248 B2 | 5/2002 | Johnston et al. |
| 6,390,158 B2 | 5/2002 | Johnston |
| 6,435,496 B1 | 8/2002 | Philips |
| 6,443,514 B1 | 9/2002 | Fuller et al. |
| 6,474,914 B1 | 11/2002 | Lang |
| 6,530,567 B1 | 3/2003 | Lang |
| 6,551,220 B1 | 4/2003 | Schroeder |
| 6,631,543 B2 | 10/2003 | Retzbach |
| 6,652,012 B1 | 11/2003 | Fuller et al. |
| 6,702,721 B2 | 3/2004 | Schroeder |
| 6,719,281 B2 | 4/2004 | Kohlert |
| 6,736,383 B2 | 5/2004 | Kohlert |
| 6,783,310 B2 | 8/2004 | Kohlert et al. |
| 6,799,757 B1 | 10/2004 | Lang |
| 6,832,755 B2 | 12/2004 | Kohlert |
| 6,905,116 B2 | 6/2005 | Cummines |
| 6,929,275 B1 | 8/2005 | Schlangen |
| 6,945,916 B2 | 9/2005 | Schroeder |
| D526,068 S | 8/2006 | Schlangen et al. |
| 7,087,854 B2 | 8/2006 | Takahashi et al. |
| 7,090,030 B2 | 8/2006 | Miller |
| D533,436 S | 12/2006 | Stapulionis et al. |
| D534,777 S | 1/2007 | Miller |
| 7,163,201 B2 | 1/2007 | Bernstein |
| 7,210,541 B2 | 5/2007 | Miller |
| 7,354,350 B2 | 4/2008 | Hechtle et al. |
| 7,399,231 B2 | 7/2008 | Glimpel et al. |
| 7,419,339 B2 | 9/2008 | Glimpel et al. |
| 7,467,577 B2 | 12/2008 | Glimpel et al. |
| D596,921 S | 7/2009 | Hageman et al. |
| 7,625,292 B2 | 12/2009 | Glimpel et al. |
| 7,665,717 B2 | 2/2010 | Lenzini |
| 7,708,854 B2 | 5/2010 | Kroeninger et al. |
| 7,731,465 B2 | 6/2010 | Stapulionis et al. |
| 7,828,077 B1 | 11/2010 | Miller et al. |
| 7,891,903 B2 | 2/2011 | Klingenberg et al. |
| 7,914,225 B2 | 3/2011 | Hageman |
| 7,927,221 B2 | 4/2011 | Glimpel et al. |
| D640,521 S | 6/2011 | Tschida et al. |
| 7,998,032 B2 | 8/2011 | Schroeder |
| 8,020,877 B2 | 9/2011 | Lang |
| 8,109,494 B1 | 2/2012 | Warth |
| 8,162,581 B2 | 4/2012 | Soltis et al. |
| 8,167,291 B2 | 5/2012 | Parks et al. |
| D666,072 S | 8/2012 | Tschida et al. |
| 8,272,817 B2 | 9/2012 | Glimpel et al. |
| 8,307,849 B2 | 11/2012 | Fuller |
| 8,336,867 B1 | 12/2012 | Warth |
| D678,925 S | 3/2013 | Glimpel et al. |
| 8,408,527 B2 | 4/2013 | Klingenberg et al. |
| 8,454,004 B1 | 6/2013 | Warth |
| D686,647 S | 7/2013 | Glimpel et al. |
| 8,534,658 B2 | 9/2013 | Schron et al. |
| 8,573,578 B1 | 11/2013 | Warth |
| 8,672,310 B2 | 3/2014 | O'rell et al. |
| 8,708,323 B2 | 4/2014 | Hoyt et al. |
| 8,720,874 B2 | 5/2014 | Tschida et al. |
| 8,727,329 B2 | 5/2014 | Schron et al. |
| 8,757,693 B2 | 6/2014 | Fuller et al. |
| 8,777,530 B2 | 7/2014 | Liebald |
| 8,858,134 B2 | 10/2014 | Glimpel et al. |
| 8,905,392 B1 | 12/2014 | Warth |
| 8,920,063 B1 | 12/2014 | Easley |
| 8,992,143 B2 | 3/2015 | Glimpel et al. |
| 9,004,472 B2 | 4/2015 | Schmidt |
| 9,004,476 B2 | 4/2015 | Schmidt |
| 9,033,624 B2 | 5/2015 | Glimpel et al. |
| 9,067,766 B1 | 6/2015 | Bateman |
| 9,095,958 B2 | 8/2015 | Schmidt |
| 9,126,299 B2 | 9/2015 | O'rell et al. |
| 9,133,867 B2 | 9/2015 | Lang |
| 9,193,040 B2 | 11/2015 | Schmidt |
| 9,216,484 B2 | 12/2015 | Bishop et al. |
| 9,227,303 B1 | 1/2016 | Warth |
| 9,259,633 B2 | 2/2016 | Meyers |
| 9,302,889 B2 | 4/2016 | Bateman et al. |
| 9,352,451 B1 | 5/2016 | Warth et al. |
| 9,364,937 B2 * | 6/2016 | Taylor ................ B25B 1/2489 |
| 9,381,621 B2 | 7/2016 | Taylor et al. |
| D775,058 S | 12/2016 | Overman et al. |
| 9,570,724 B2 | 2/2017 | Lang |
| 9,610,474 B1 | 4/2017 | Carlsen |
| 9,630,267 B2 | 4/2017 | Glimpel et al. |
| 9,656,719 B1 | 5/2017 | Meyers |
| 9,662,728 B2 | 5/2017 | Glimpel et al. |
| 9,705,113 B2 | 7/2017 | Lang |
| 9,724,773 B2 | 8/2017 | Glimpel |
| 9,814,931 B1 | 11/2017 | Carlsen |
| 9,902,033 B1 | 2/2018 | Taylor et al. |
| D815,507 S | 4/2018 | Mardaus |
| 10,040,173 B1 | 8/2018 | Warth |
| 10,179,392 B2 | 1/2019 | Taylor et al. |
| 10,384,331 B2 | 8/2019 | Maggert |
| 10,450,174 B1 | 10/2019 | Kucinic et al. |
| 10,603,750 B1 | 3/2020 | Taylor et al. |
| 2003/0111786 A1 * | 6/2003 | Fries .................. B23Q 1/0072 269/309 |
| 2004/0256780 A1 | 12/2004 | Lang |
| 2010/0219573 A1 | 9/2010 | O'rell et al. |
| 2014/0001692 A1 | 1/2014 | Schmidt |
| 2014/0197587 A1 | 7/2014 | O'rell et al. |
| 2015/0020372 A1 | 1/2015 | Linder et al. |
| 2017/0165801 A1 * | 6/2017 | Chuang ................ B23B 31/107 |
| 2017/0368651 A1 | 12/2017 | Lang |
| 2018/0099383 A1 | 4/2018 | Maggert |
| 2020/0070291 A1 | 3/2020 | Chou |
| 2020/0189051 A1 | 6/2020 | Taylor et al. |

FOREIGN PATENT DOCUMENTS

| | | |
|---|---|---|
| EP | 0238734 A1 * | 9/1987 |
| JP | 2017164846 | 9/2017 |

OTHER PUBLICATIONS

"Vise Jaws Grip Small Surfaces", Dec. 16, 2013, https://www.aerospacemanufacturinganddesign.com/article/amd1213-sintergrip-vise-jaws.

* cited by examiner

US 11,878,381 B2

TOOLING BASE ASSEMBLY

CROSS-REFERENCE TO RELATED APPLICATION

This application is a non-provisional of U.S. Patent Application Ser. No. 63/061,973, filed Aug. 6, 2020, which is incorporated herein by reference.

BACKGROUND

Known tooling bases are used to hold a tool or workpiece (e.g., a vise) to a work surface for machining. The tooling base allows the workpieces to be removed and re-attached while maintaining accurate registration with the work surface for machining. Often, existing tooling bases do not locate a workpiece accurately enough, or do not hold the workpiece securely enough.

For these and other reasons, a need exists for the present invention.

SUMMARY

One or more examples include a base assembly for securely and accurately mounting a workpiece to a work surface. The base assembly includes a work holder in the form of a base body having openings for accepting clamping pins of an accessory workpiece. A clamping assembly is positioned within the base body. The clamping assembly includes a closed position and an open position. In the closed position an accessory workpiece is locked into place in the workholder, and in the open position an accessory workpiece is released from the workholder.

In further detail, the clamping assembly includes a lead screw. Two opposing pull bars are coupled to the lead screw. By rotating the lead screw, the two pull bars can be drawn together or moved apart. Four clamping yokes are coupled to the pull bars, with openings positioned about the openings in the base body. In operation, the pull studs of an accessory workpiece are positioned in the openings of the base body. By applying a rotational force to the lead screw, an axial force is imparted on the pull studs via the clamping yokes to lock the accessory tool or workpiece in place on the base assembly. In a similar manner, reversing the rotational force on the lead screw releases the axial force applied by the clamping yokes to the pull studs and thereby releasing the accessory workpiece from the base assembly. In one example, pull studs are pulled inward from the outer surfaces. In one example, pull studs can flex resiliently to more accurately locate a workpiece as it is clamped down. And in one example, a clamping mechanism has some freedom of lateral movement to more equally distribute clamping forces to the pull studs.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 illustrates one example of a tooling base assembly in elevational view.

FIG. 2 illustrates one example of a tooling base assembly in exploded view.

FIG. 3 illustrates one example of a tooling base assembly in a closed position.

FIG. 4 illustrates one example of a tooling base assembly in an open position.

FIG. 5 is a perspective view illustrating one example of positioning a workpiece on a tooling base assembly.

FIG. 6 is a perspective view illustrating one example of positioning a workpiece on a tooling base assembly.

FIG. 7 is a cross-sectional view illustrating one example of positioning a workpiece on a tooling base assembly.

FIG. 8 is a cross-sectional view illustrating one example of a workpiece positioned on a tooling base assembly in an open position.

FIG. 9 is a cross-sectional view illustrating one example of a workpiece positioned on a tooling base assembly in a closed position.

FIG. 10 is a view illustrating one example of a tooling base assembly moment arm with outer gripping of a workpiece.

FIG. 11 is a view illustrating one example of a tooling base assembly moment arm with inner gripping of a workpiece.

FIG. 12 is a perspective view illustrating one example of a tooling base assembly with mounting pads.

FIG. 13 is a bottom perspective view illustrating one example of a tooling base assembly having a cover plate.

FIG. 14 illustrates one example of a lead screw for use with a tooling base assembly.

FIG. 15 is a top perspective view illustrating one example of a mounting stud.

FIG. 16 is a side view illustrating one example of the mounting stud of FIG. 15.

FIG. 17 is a side perspective view of a tooling base assembly with a centering device.

FIG. 18 is a top perspective view of a tooling base assembly with a centering device.

FIG. 19 is a top perspective view of the cover plate with a centering device illustrated in FIG. 18.

FIG. 20 is a perspective view illustrating a tooling base assembly with a workpiece, where the workpiece includes a vise.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

One or more examples include a tooling base assembly for securely and accurately mounting a workpiece to a work surface. The unique tooling base assembly includes a clamping assembly that radially grips and downward presses workpiece pull studs, providing for accurate and secure positioning of the workpiece on a work surface.

A truly radial gripping and downward pressing of the pull studs within the assembly begets better precision of location of the top workpiece. In one embodiment illustrated, it is recognized that there is an advantage to outer gripping of the pull studs. In an alternative embodiment, it is recognized that inner gripping of the pull studs can also be advantageous using the unique clamping assembly of the present disclosure.

Figure 10:
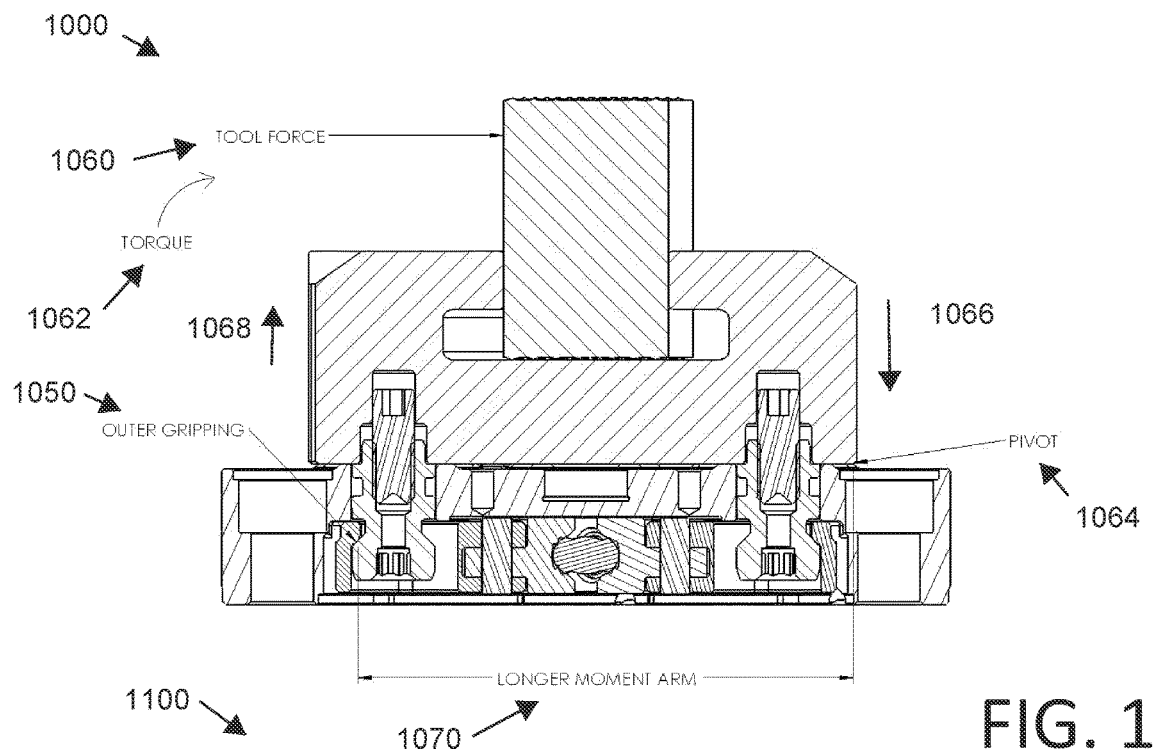

Very often in machining operations a tool-force is applied which is lateral with respect to the work-piece and work-holding assembly, which may consist of a base and vise. There is a significant mechanical advantage to outer-gripping of the pull studs, (as can be seen in FIG. 10) because of the large diameter of the pull studs relative to their spacing. The tool-force applies a moment to the system, in addition to the lateral force, tending to push one side of the vise down onto the base, and applying a lifting force to the other side. In further reference to FIG. 10 and also FIG. 11, if the pull studs are held more at the outside of the assembly, away from the center, there is a longer moment arm, or a mechanical advantage of holding, or resistance to the lifting force, as is achieved with an outer-gripping mechanism, rather than if the pull stud is held more toward the center of the assembly, such as with an inner-gripping mechanism.

Figure 1:
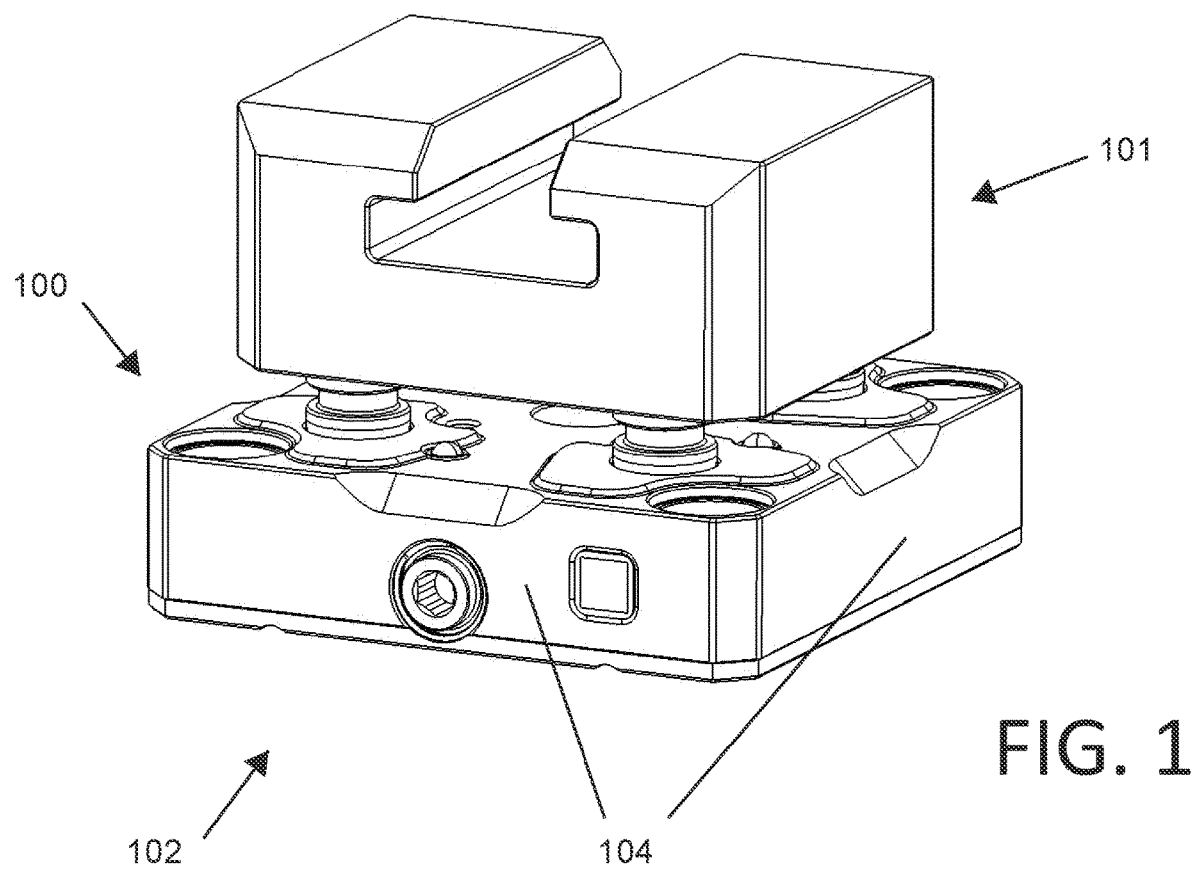
FIGS. 1-20 illustrate one or more examples of a tooling base assembly for precisely and securely mounting a workpiece to a work surface.

FIG. 1 illustrates one example of a tooling base assembly in elevational view, generally at 100. The tooling base 100 is for holding a workpiece 101, and includes a base assembly 102 and a clamping assembly 104 (positioned within base assembly 102). The clamping assembly 104 imparts a radial force and downward force on a workpiece to precision secure the workpiece 101 to the base assembly 102. In one example, the radial force is an inward radial force towards a center of the base assembly 102. In one example, the clamping assembly imparts outer gripping of a workpiece with an inward radial force and also imparts a downward force between the workpiece and the base assembly 102.

The tooling base assembly 100 operates to securely and accurately position a workpiece (partially shown) on a work surface for machining. The base assembly 100 provides a number of unique mechanical advantages as detailed herein. The base assembly 100's unique design provides a clamping assembly for pulling of a tool or workpiece pull studs inward with a constant force at each pull stud. The clamping assembly is allowed to float or move and self-adjust within the base assembly. The pull studs are pulled radially inward towards the center of the base assembly, providing a precise self-leveling of a workpiece. This unique design leads to precision, accuracy and repeatability for positioning a workpiece on a work surface for machining.

Figure 2:
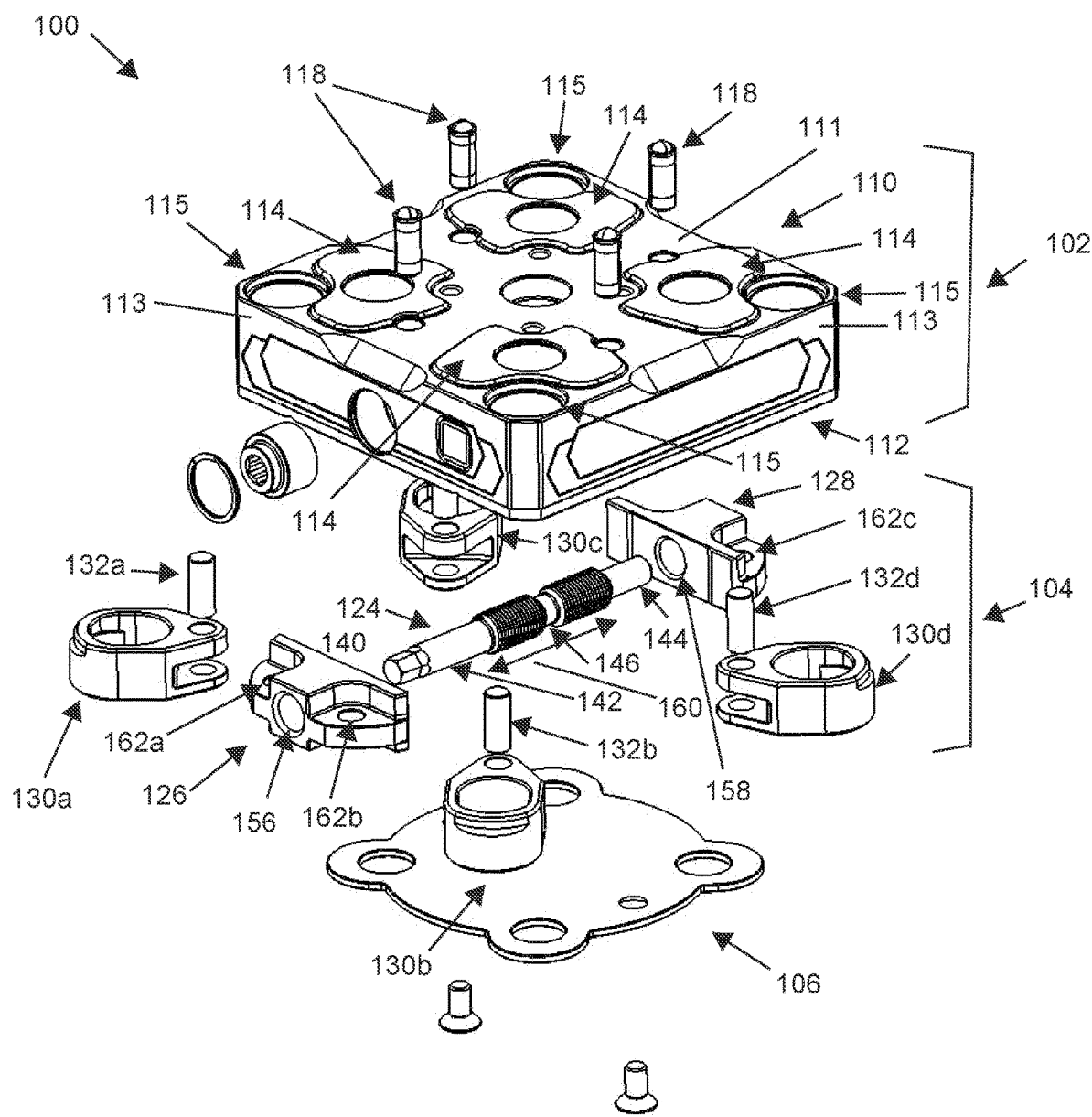

FIG. 2 illustrates one example of a tooling base assembly 100 in exploded view. Tooling base assembly 100 includes a base assembly 102 and clamping assembly 104. A cover plate 106 is used to retain base assembly 102 within clamping assembly 104. In one example, cover plate 106 allows clamping assembly 104 to "float" (and as such, self-adjust) within base assembly 102. This aids in providing for precise and secure positioning of a workpiece on tooling base assembly 100.

Base assembly 102 includes a base body 110. In one example, the base body 110 is generally rectangular or square shaped. In other examples, the base body may take on other shapes, such as being circular or oval shaped. The base body 110 includes a first major surface 111, a second major surface 112 and side surfaces 113. Mounting sockets 114 extend through first major surface 111. Mounting pads are located on first major surface 111. In one example, mounting pads 116 are positioned about mounting sockets 114. When a workpiece is positioned within mounting sockets 111, the workpiece is positioned against and contacts mounting pads 116. In one example, mounting sockets 114 are pull stud sockets that are sized and configured to receive and retain a corresponding pull stud from a workpiece.

Mounting pads 116 are raised above first major surface 111 allowing for removal of swarf, fluids and other bi-products from the first major surface without interfering with a workpiece positioned on the surface. Mounting openings 115 operate to allow the base assembly to be mounted to a work surface. Additionally, ball plungers 118 may extend from first major surface 111 to aid in maintaining a workpiece on the tooling base assembly 100. In one example, the ball plungers 118 operate to push upward on a workpiece positioned on the tooling base assembly 100.

Figure 2A:
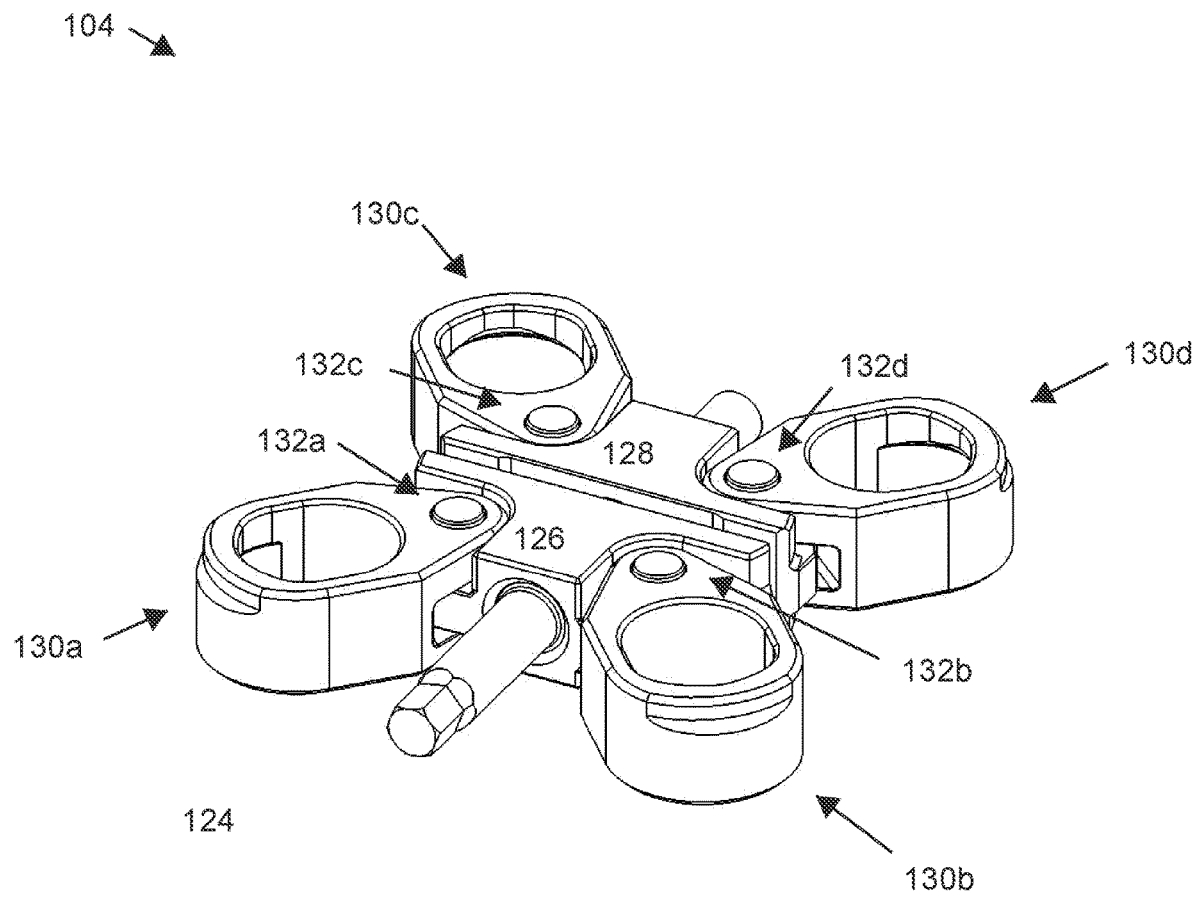
FIG. 2a illustrates one example of a clamping assembly.

Clamping assembly 104 operates to securely retain and precisely position a workpiece on base assembly 102. Clamping assembly 104 includes a lead screw 124, pull bars 126 and 128, clamping mechanisms 130 and connector pins 132. Lead screw 124 includes a shaft 140 having a first portion 142, second portion 144, and middle portion 146. First portion 142 includes lefthand threads 150 adjacent middle portion 146. Second portion 144 includes righthand threads 152 adjacent middle portion 146. Referring also to FIG. 2a, when clamping assembly 104 is assembled, pull bar 126 is positioned on the shaft 140 first portion 142 via opening 156. In a similar manner, pull bar 128 is positioned on shaft 140 second portion 144 via opening 158. Pull bar 126 and pull bar 128 are positioned on shaft 140 in an opposing manner. Rotating shaft 140 in a clockwise or counter clockwise manner about its longitudinally extending axis causes pull bar 126 and pull bar 128 to move together or apart along the longitudinal axis, indicated by directional arrow 160.

The pull bars 126, 128 are rotatably coupled to their respective clamping mechanisms 130a, 130b, 130c, 130d. In one example, pull bar 126 includes a pair of openings 162a, 162b. Pull bar 128 includes a pair of openings 162c, 162d (not shown). Each clamping mechanism 130a, 130b, 130c, 130d includes a corresponding vertical opening 164a, 164b, 164c, 164d having a middle slot 166a, 166b, 166c, 166d.

In assembly, clamping mechanism 130a is inserted onto pull bar 126 at slot 164a such that openings 162a and opening 164a are aligned, and pin 132a is inserted vertically therethrough. Clamping mechanism 130b is inserted onto pull bar 126 at slot 164b such that openings 162b and opening 164b are aligned, and pin 132b is inserted vertically therethrough. Clamping mechanism 130c is inserted onto pull bar 128 at slot 164c such that openings 162c and opening 164c are aligned, and pin 132c is inserted vertically therethrough. Clamping mechanism 130d is inserted onto pull bar 128 at slot 164d such that openings 162d and opening 164d are aligned, and pin 132d is inserted vertically therethrough.

In one example, pins 132a, 132b, 132c, 132d are made of metal. In one aspect, pins 132a, 132b, 132c, 132d are made of a coated metal. Clamping mechanisms 130a, 130b, 130c, 130d are yokes or generally yoke shaped with an oval shaped opening therethrough. In other examples, the clamping mechanisms may take on other shapes and/or may have other shaped openings.

By rotating the lead screw 124, the two opposing pull bars 126 and 128 are drawn together or moved apart. Four clamping mechanisms 130a, 130b, 130c, 130d are rotatably coupled to the respective clamping pull bars 264 and 128 respectively, with openings positioned about the corresponding socket 114a, 114b, 114c, 114d openings in the base body 110.

In one example of operation, the pull studs of an accessory tool or workpiece are positioned in the sockets 114a, 114b, 114c, 114d of the base body 110. By applying a rotational force to the lead screw 124, a simultaneously radially inward and axial force is imparted on the workpiece pull studs via the clamping mechanisms (e.g., yokes) 130a, b,c,d to lock a workpiece or accessory workpiece in place on the tooling base assembly 100. In one example, due to the angled contact surface of the pull studs, the pull studs locked in place by a radially inward force and also a downward force. One example of a pull stud profile for use with the clamping assembly 104 is described in detail later in this specification. In a similar manner, reversing the rotational force on the lead screw 124 releases the axial force applied by the clamping yokes 130 to the pull studs and thereby releasing the accessory workpiece from the tooling base assembly 100.

Tooling base assembly 100 may further include socket extension 172. Socket extension 172 uniquely allows the same sized clamping assembly 104 to be used with differently sized and shaped base assemblies. Socket extension 172 is positioned at opening 174 in base body 110. Socket ring 176 operates to retain socket extension 172 against the base body 110. Socket extension 172 is mechanically coupled to end 178 of lead screw 124 shaft 140. Internally, socket extension 172 rotates with lead screw 124, relative to base body 110. Externally, socket extension 172 is secured to base body 110. Socket extension 172 is an extender for accessing lead screw 124 with a tool to rotate the lead screw 124. As such, the same sized clamping assembly with identical internal components may be utilized for different sized base assemblies since the lead screw is still be accessible via the socket extension 172.

Figure 3:
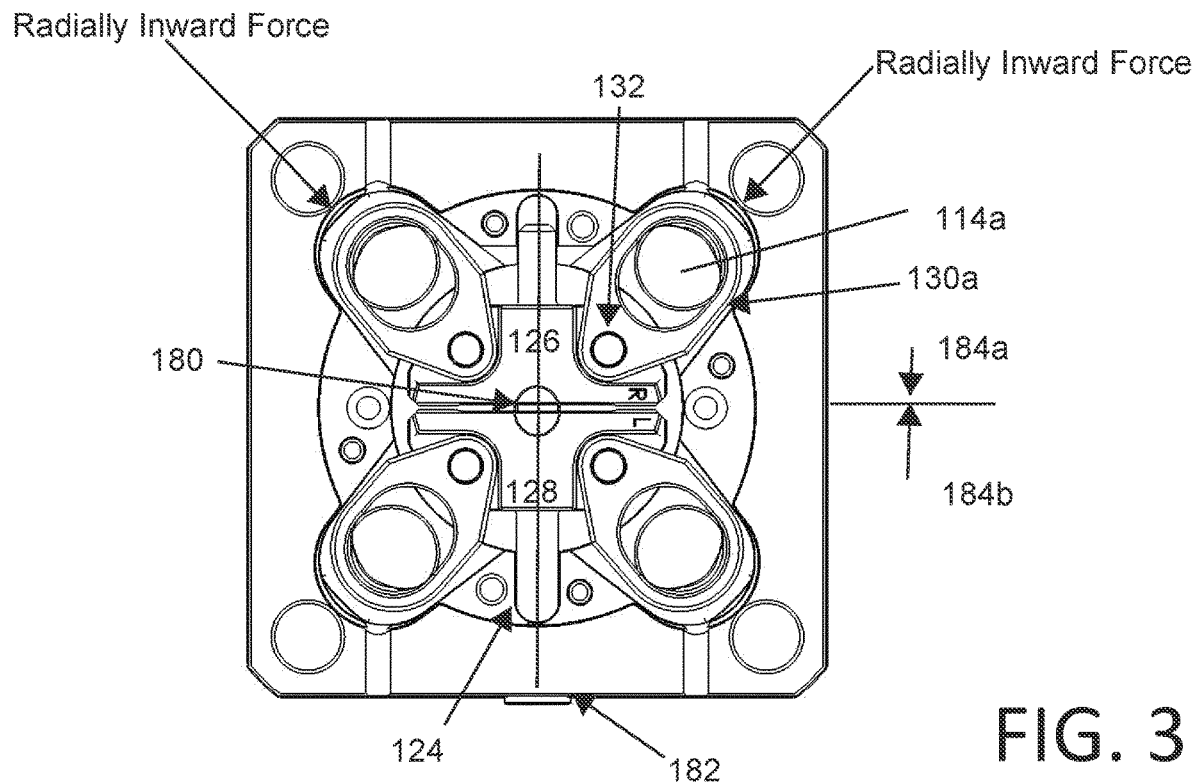
Figure 4:
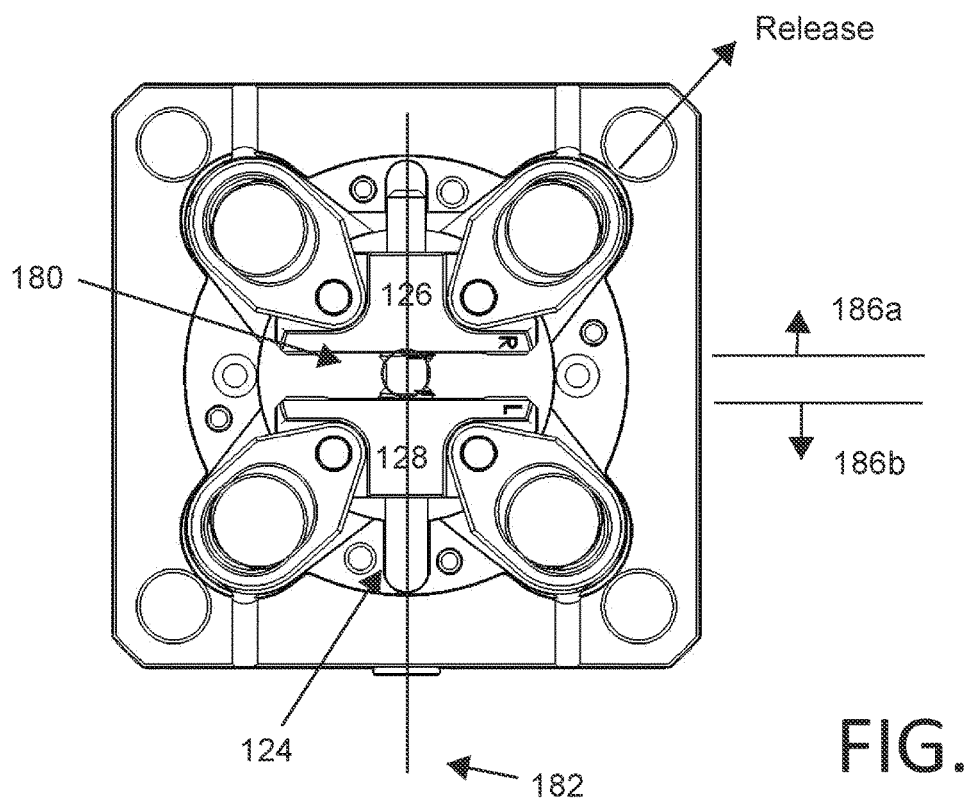

FIG. 3 and FIG. 4 illustrate one example of the tooling base assembly 100 moving between a closed position and an open position, without a workpiece retained therein. FIG. 3 illustrates the tooling base assembly 100 in closed position. FIG. 4 illustrates the tooling base assembly 100 in an open position. Cover plate 106 is shown removed for ease of viewing clamping assembly 104. For further clarity, pull studs that would be positioned within tooling base assembly 100 are also not shown. In this example, the operation of clamping assembly 104 is described in detail with reference to clamping mechanism 130a.

In FIG. 3, clamping mechanism 130a is illustrated in a closed position. Lead screw 124 is rotated, causing pull bar 126 and pull bar 128 to move to center area 180 along lead screw longitudinal axis 182, indicated by directional arrows 184a,b. Clamping mechanism 130a yoke is rotatably coupled to pull bar 126 at pin 132a. As such, moving pull bar 126 and pull bar 128 inward causes a radially inward force to be applied to a pull stud located within clamping mechanism 130a. The radially inward force results in outer gripping of a pull stud located socket 114a. This results in precision and secure retention of a pull stud located within the socket 114a. Further, the whole clamping assembly is allowed to float within the base assembly 102, allowing for repeatable positioning and securing of a pull stud located within the socket 114a.

In FIG. 4, clamping assembly 130a is illustrated in an open position. In operation, by rotating lead screw 124 in an opposite direction, pull bar 126 and pull bar 128 are moved apart along longitudinal axis 182. Pull bar 126 and pull bar 128 are move away from center area 180, indicated by directional arrows 186a and 186b. This causes the clamping mechanism 130a to move in a direction radially outward from center area 180, thereby releasing a workpiece retained within the tooling base assembly.

Figure 5:
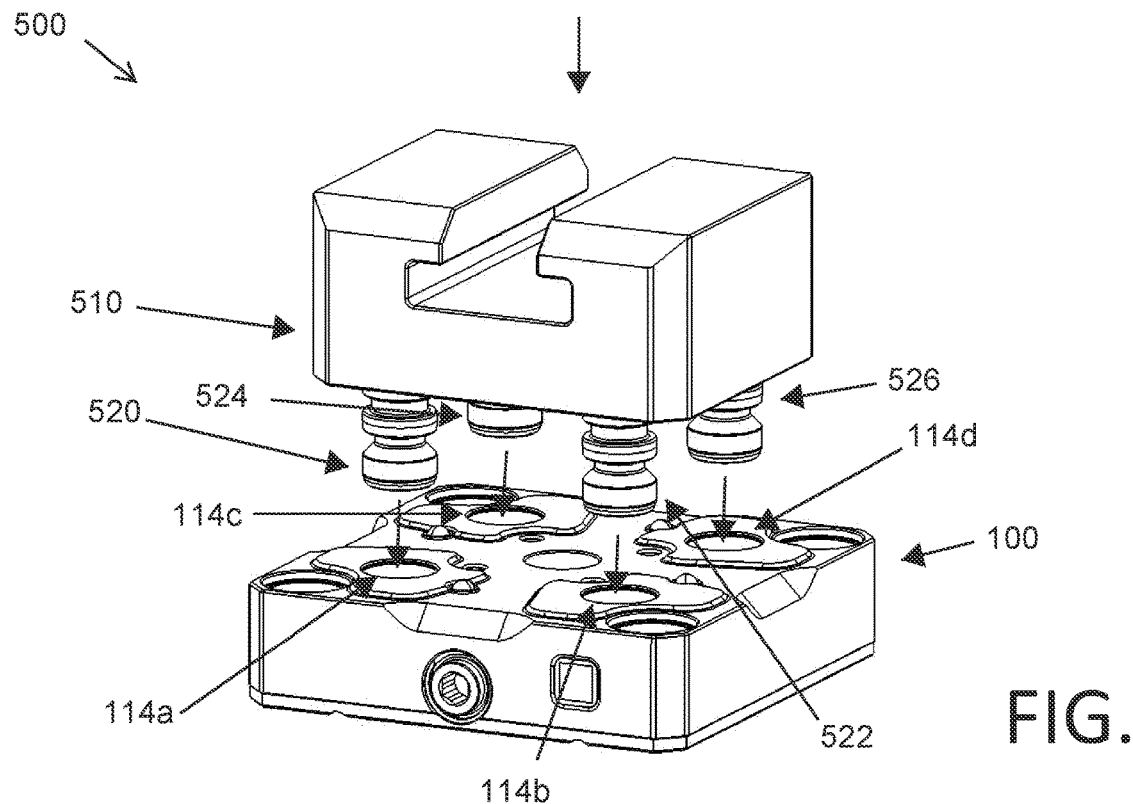
Figure 6:
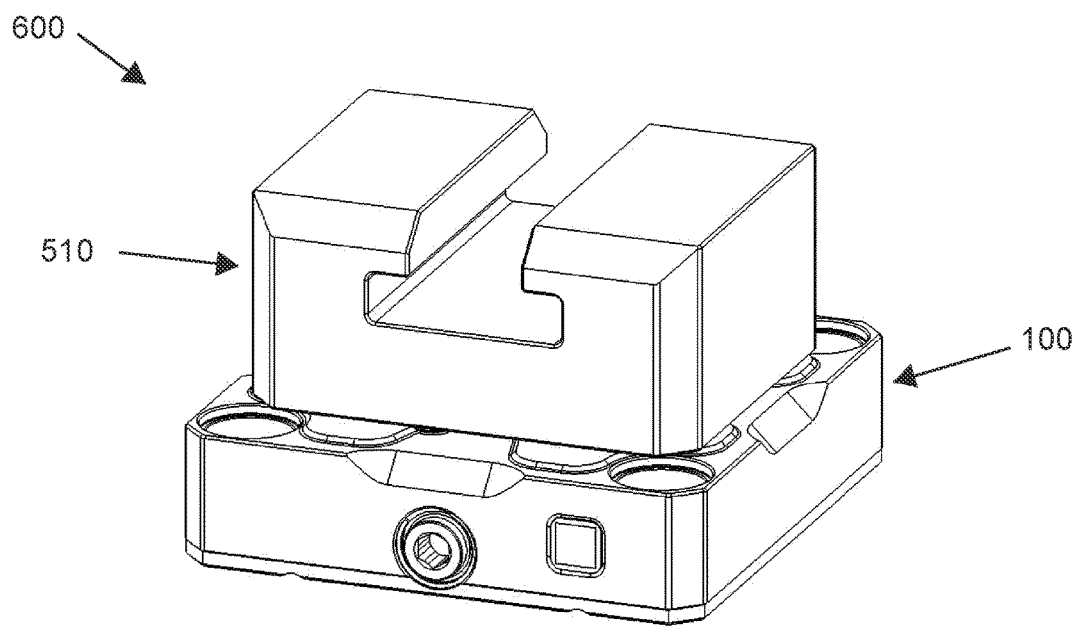

FIG. 5 and FIG. 6 illustrate one example of a workpiece or tool being positioned and retained within a tooling base assembly. FIG. 5 is a perspective view illustrating a workpiece positioned over the tooling base assembly generally at 500. FIG. 6 is a perspective view illustrating a workpiece being positioned and retained within tooling base assembly 100 generally at 600. The workpiece or tool can be a number of different workpieces used for industrial or manufacturing purposes. In one example illustrated herein, the workpiece is part of a vise assembly. Additionally, the terms workpiece or tool are used interchangeably herein.

In FIG. 5, a workpiece 510 is aligned over the base assembly 102. The workpiece 510 includes pull studs 520, 522, 524, 526 in alignment with sockets 114a, 114b, 114c, 114d for positioning of the workpiece 510 on the tooling base assembly 100. In FIG. 6, workpiece 510 is positioned on tooling base assembly 100. Pull studs 520,522,524,526 are inserted within corresponding sockets 114a, 114b, 114c, and 114d.

Figure 7:
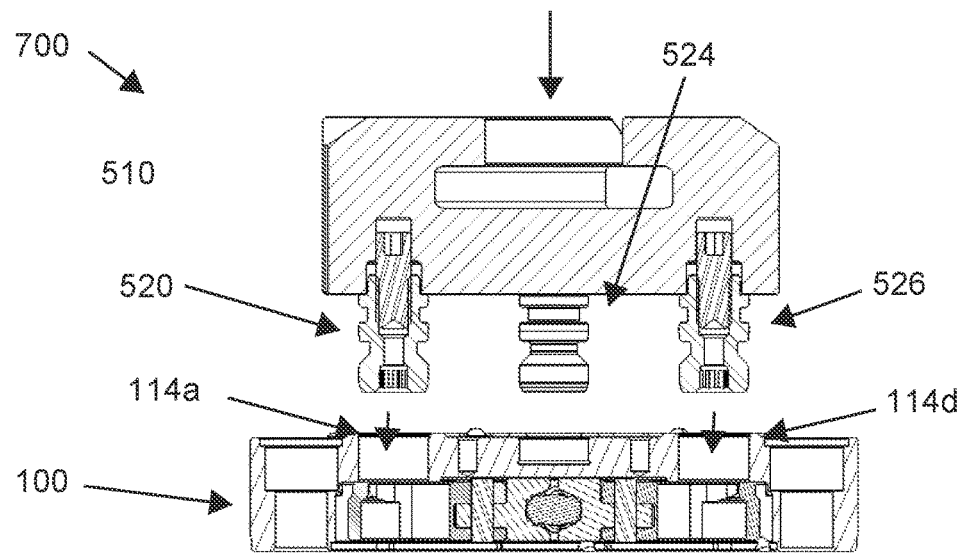

FIG. 7 is a cross-sectional view illustrating one example of positioning a workpiece on a tooling base assembly, shown generally at 700. Workpiece 510 is positioned over tooling base assembly 100. Pull stud 520 is aligned with socket 114a. Pull stud 526 is aligned with socket 114d.

Figure 8:
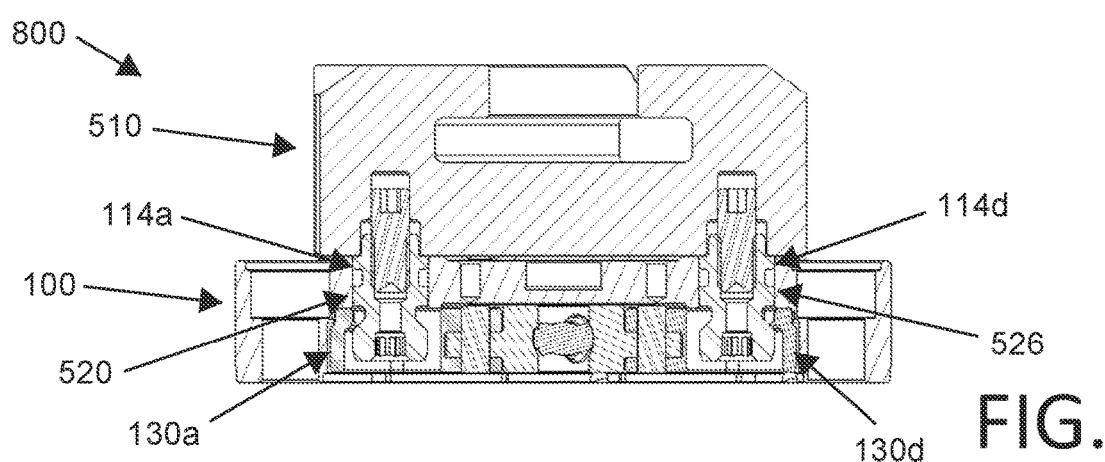

FIG. 8 is a cross-sectional view illustrating one example of a workpiece positioned on a tooling base assembly in an open position, shown generally at 800. Workpiece 510 is positioned on a first major surface of tooling base assembly 100 base body 110. Pull stud 520 is positioned within socket 114a. Clamping mechanism 130a is positioned about pull stud 520. Similarly, pull stud 526 is positioned within socket 114d. Clamping mechanism 130d is positioned about pull stud 526.

Figure 9:
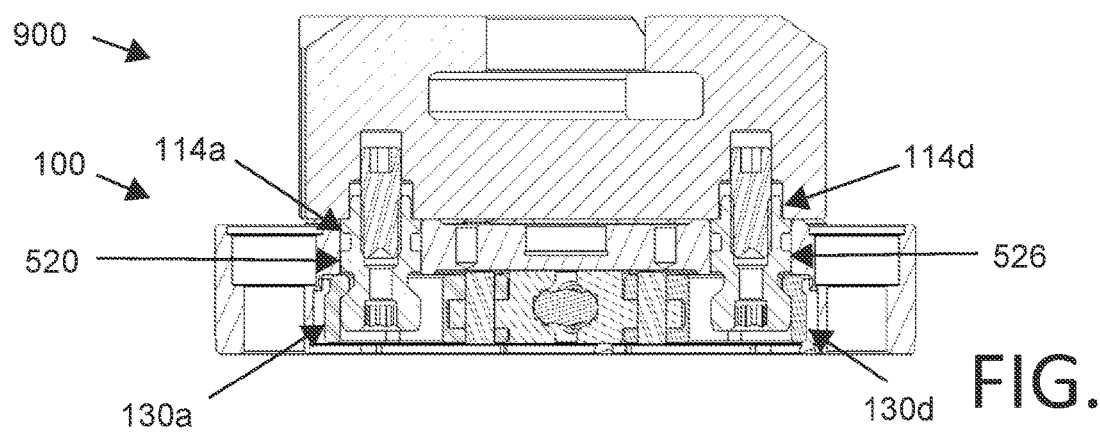

FIG. 9 is a cross-sectional view illustrating one example of a workpiece positioned on a tooling base assembly in a closed position, shown generally at 900. In this position, workpiece 510 is precisely located and retained within tooling base assembly 100. Lead screw 124 has been rotated to move opposing pull bars 126, 128 together at a center area 180 as previously detailed herein. Clamping mechanism 130a provides outer gripping of pull stud 520, and a radially inward retaining force on pull stud 520 to securely retain it within socket 114a. Clamping mechanism 130d provides outer gripping of pull stud 526, and a radially inward retaining force on pull stud 526 to securely retain it within socket 114d. Additionally, due to the interaction of the clamping mechanisms and pull stud angled surfaces, a downward force is imparted to the pull studs to further lock and secure the workpiece in place.

Figure 11:
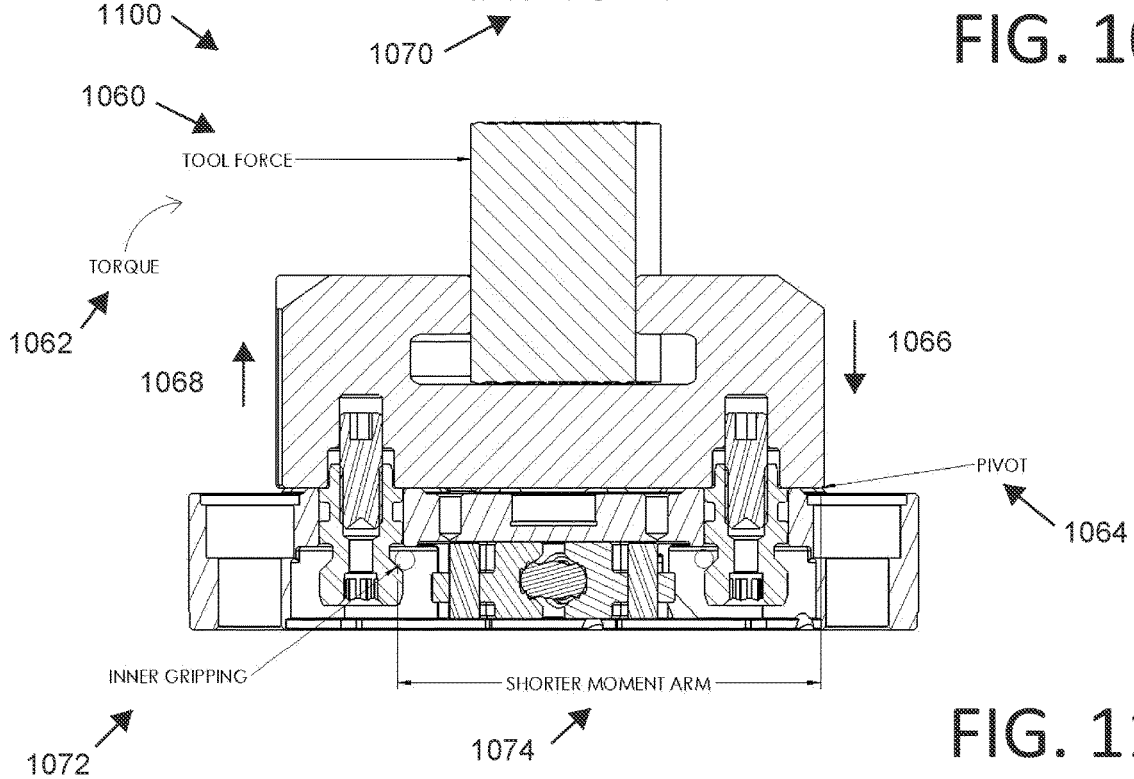

FIG. 10 and FIG. 11 illustrate one example of the many advantageous of radial outer gripping of the pull studs by the tooling base assembly 100. FIG. 10 illustrates one example of a work piece positioned on tooling base assembly 100, generally at 1000. The pull studs of work piece 500 are retained by tooling base assembly 100 in an outer gripping configuration indicated at 1050. Very often in machining operations a tool-force 1060 is applied which is lateral with respect to the work-piece 500 and tooling base assembly 100. In one example illustrated, the work piece 500 consists of a vise. There is a significant mechanical advantage to outer-gripping of the pull studs because of the large diameter of the pull studs relative to their spacing. The tool-force 1060 applies a moment 1062 to the system, in addition to the lateral workpiece force 1060, tending to push one side of the vise down onto the base at pivot location 1064 indicated by down arrow 1066, and applying a lifting force to the other side indicated by up arrow 1068. If the pull studs are held more at the outside of the assembly, away from the center, there is a longer moment arm 1070, or a mechanical advantage of holding, or resistance to the lifting force, as is achieved with an outer-gripping mechanism, relative to if the pull stud is held more toward the center of the assembly, such as with an inner-gripping mechanism 1072 indicated in FIG. 11 at 1100. Moment arm 1070 due to outer gripping of the pull studs is longer relative to moment arm 1074 resulting from inner gripping of the pull studs.

Figure 12:
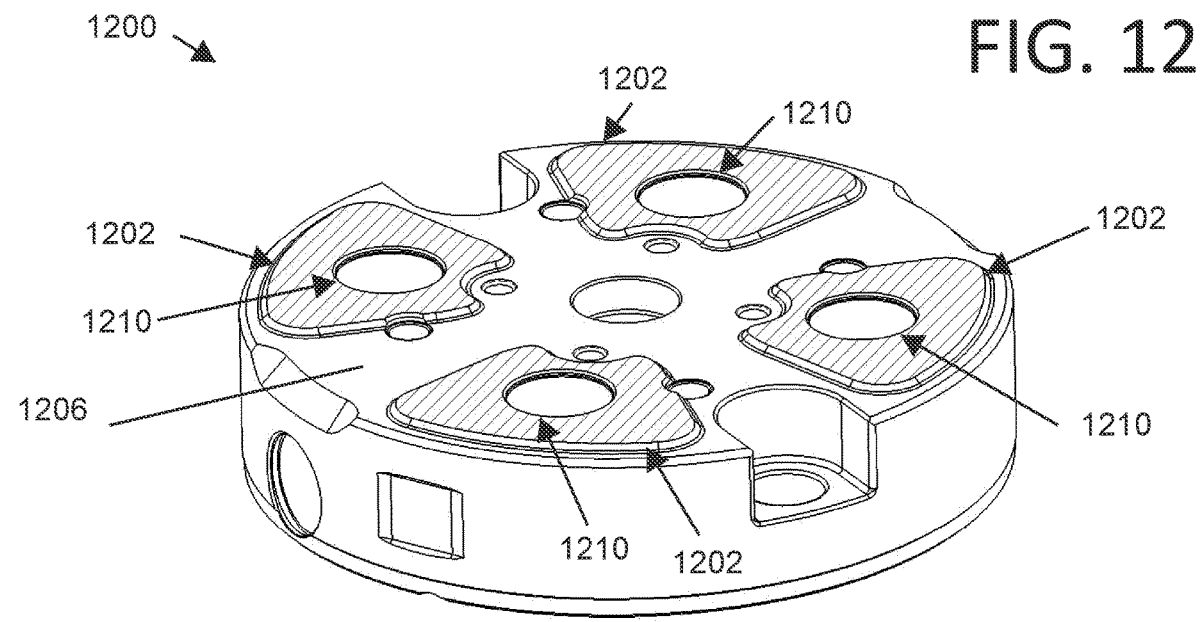

FIG. 12 is a perspective view illustrating one example of a tooling base assembly 1200 with mounting pads 1202. Mounting pads 1202 are similar to the mounting pads previously detailed herein. Mounting pads 1202 are located on base body 1204 on first major surface 1206 and are raised above the first major surface 1206. In one example, mounting pads 1202 are positioned about mounting sockets 1210. When a workpiece is positioned within mounting sockets 1210, the workpiece is positioned against and contacts mounting pads 1202. Mounting pads 1202 are raised above first major surface 1206 allowing for removal and better drainage of work extras, solvents, or other solutions away from the precision contact surface and without interfering with a workpiece positioned on the surface 1206. In one example, mounting pads 1202 are formed as one integral part of the base body and are made of metal (e.g., steel).

The base body is designed with raised contact pads. This in combination with a 4 post system allows a workpiece to contact the base assembly at the raised contact pads. The raised contact pads allow for a precision contact surface. Additionally, if necessary, the contact pads allow for better drainage of work extras, solvents, or solutions at a location away from the precision contact surface.

Figure 13:
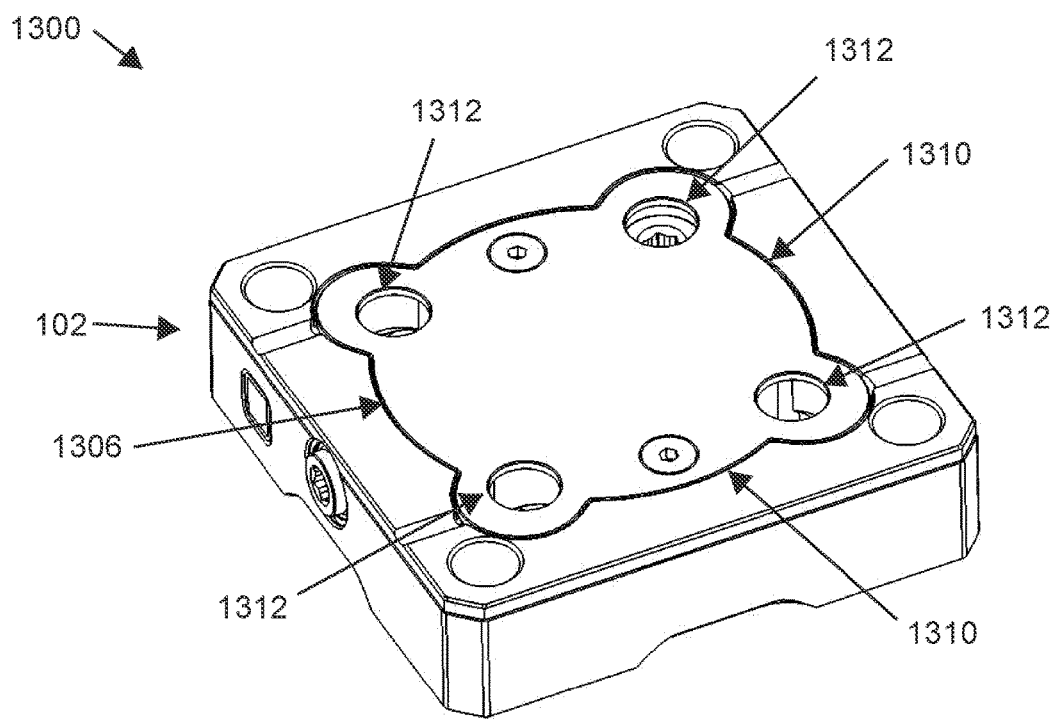

FIG. 13 is a bottom perspective view of base assembly 102, indicated generally at 1300. Base assembly 102 includes cover plate 1306 which is similar to cover plate 106 previously detailed herein. Cover plate 1306 is positioned within recess 1310 located on the bottom of base body 110. Cover plate 1306 may include openings 1312 to aid in allowing tooling base assembly to be coupled (e.g., bolted) to a work surface. Cover plate 1306 is used to retain clamping assembly 104 (not shown in FIG. 13) within base assembly 102. In one example, cover plate 1306 is very advantageous to tooling base assembly 100 since it allows clamping assembly 104 to "float" and as such self-adjust within base assembly 102. This aids in providing for precise and secure positioning of a workpiece on tooling base assembly 100. Cover plate 1306 may also include one or more centering mechanisms to aid in centering a workpiece on the tooling base assembly, or centering the clamping assembly 104 within the base assembly 102.

Figure 14:
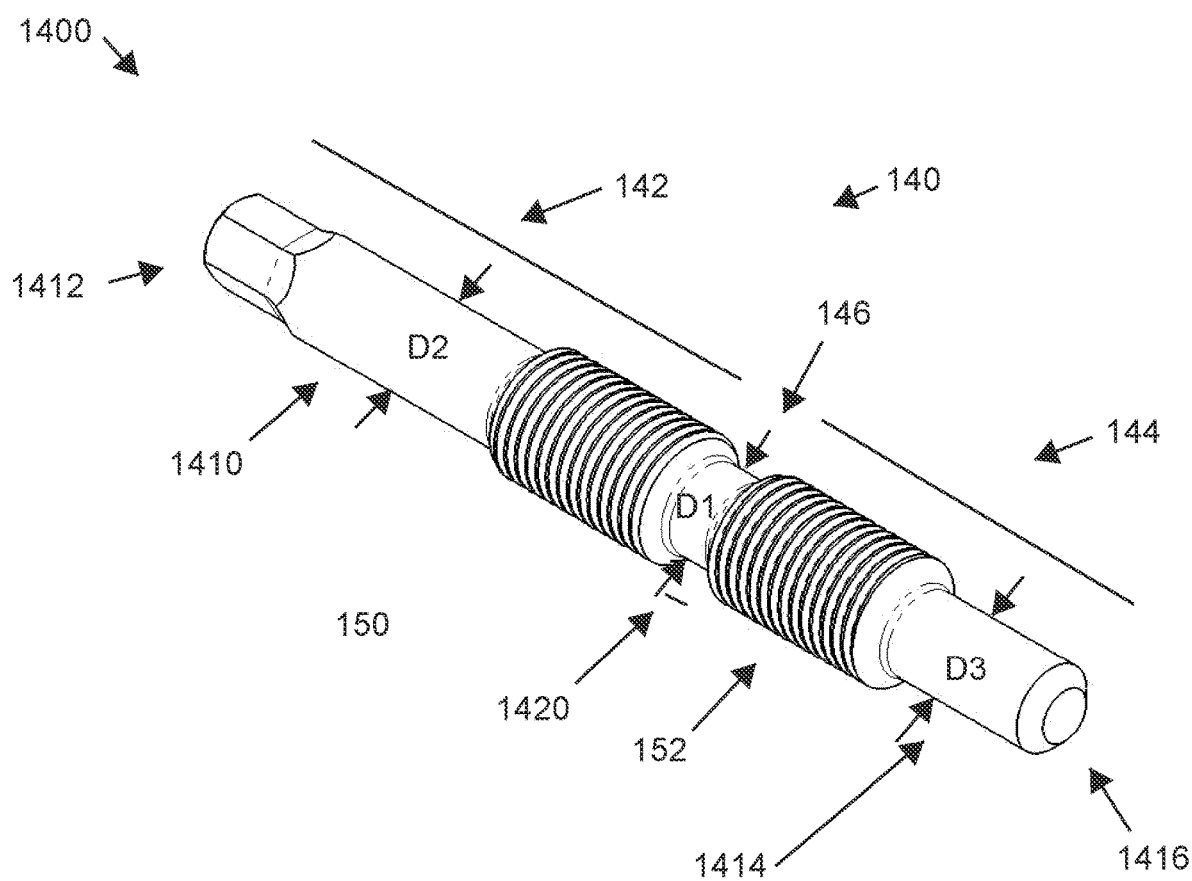

FIG. 14 illustrates one example of a lead screw for use with a tooling base assembly, shown generally at 1400. Lead screw 1400 is similar to the lead screws previously detailed herein. Leadscrew 1400 operates to move the stud bars inward and outward, moving the yokes between an open position and a closed position. Advantageously, lead screw 1400 is a "fused" lead screw. As such, the lead screw 1400 includes one or more fused or weakened locations along its shaft that predefine where the lead screw shaft would break should undue pressure be put on the shaft.

Lead screw 1400 includes shaft 140 having first portion 142, second portion 144, and middle portion 146. First portion 142 includes lefthand threads 150 adjacent middle portion 146. Second portion 144 includes righthand threads 152 adjacent middle portion 146. First portion 142 further includes first portion shaft 1410 and end 1412. In one example, end 1412 is configured to mechanically removably couple to a tool for rotating the lead screw 1400 during operation of tooling base assembly. Second portion 144 includes a second portion shaft 1414 and an end 1416.

A fuse 1420 is located along shaft 140 that defines a predefined breakage or sheer location where it is desired that the shaft break should undue pressure be put on the shaft. In one example, the fuse is located outside of lefthand threads 150 and righthand threads 152. In one example, the fuse is located at middle portion 146 and is defined as an area having a reduced diameter that is smaller than the diameter of the rest of the shaft 140. For example, fuse 1420 has a diameter D1 that is smaller than the diameter D2 of first portion shaft 1410 and diameter D3 of second portion shaft 1414.

The middle portion 146 will act as a "fuse" or "sheer point." As such, if there is excessive torque or pressure on the leadscrew 1400 it will tend to break in the predetermined or designed fuse location at the middle portion 146. A break at the middle portion 146 allows pull bars located on the lead screw to move apart and release the workpiece, in a predetermined manner. This is very advantageous and beneficial as opposed to a break along the lead screw in a different location such as the lead screw threaded portions.

Figure 15:
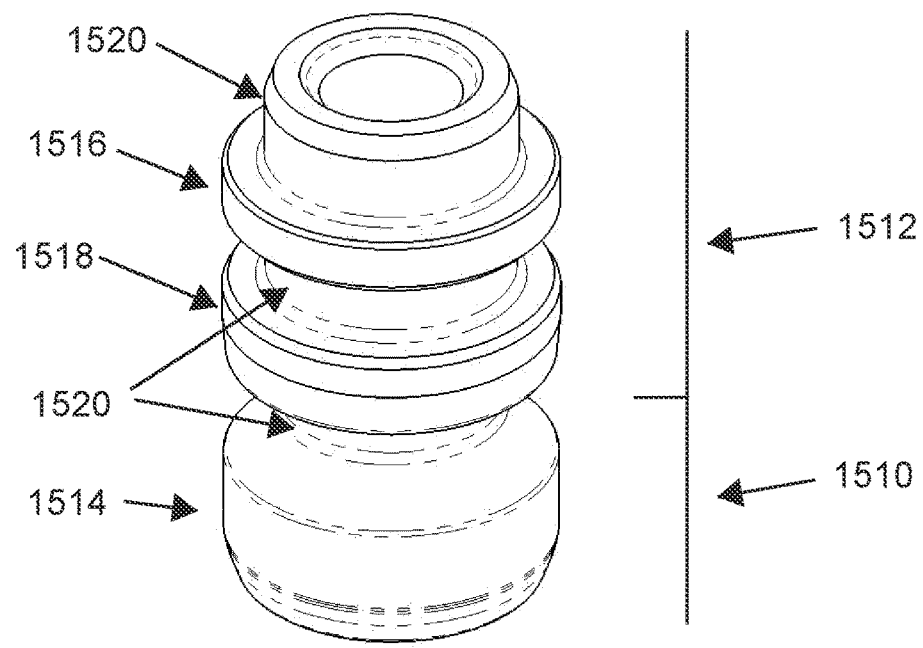

FIG. 15 illustrates one example of a pull stud design for use with the tooling base assembly of the present application generally at 1500. In one example, the pull studs used with the base assembly have a unique profile that maximizes precision location of the workpiece along with providing some elasticity with a preloaded force that prevents the workpiece from moving. The pull stud 1500 is one example of pull studs 520, 522, 524 and 526 previously described herein.

In one example, the pull stud 1500 is symmetrical and has the same profile when viewed from any side. In other embodiments, the pull stud 1500 may not be symmetrical. In one example, pull stud 1500 is made of metal. In other embodiments, pull stud 1500 is made of a nonmetal material.

In one example design illustrated, the pull stud 1500 has a profile that includes a lower portion 1510 and an upper portion 1512. The lower portion 1510 includes a lower collar 1514, and the upper portion 1512 includes a first upper collar 1516 and a second upper collar 1518. A center column 1520 extends through the lower portion 1510 and the upper portion 1512.

Figure 16:
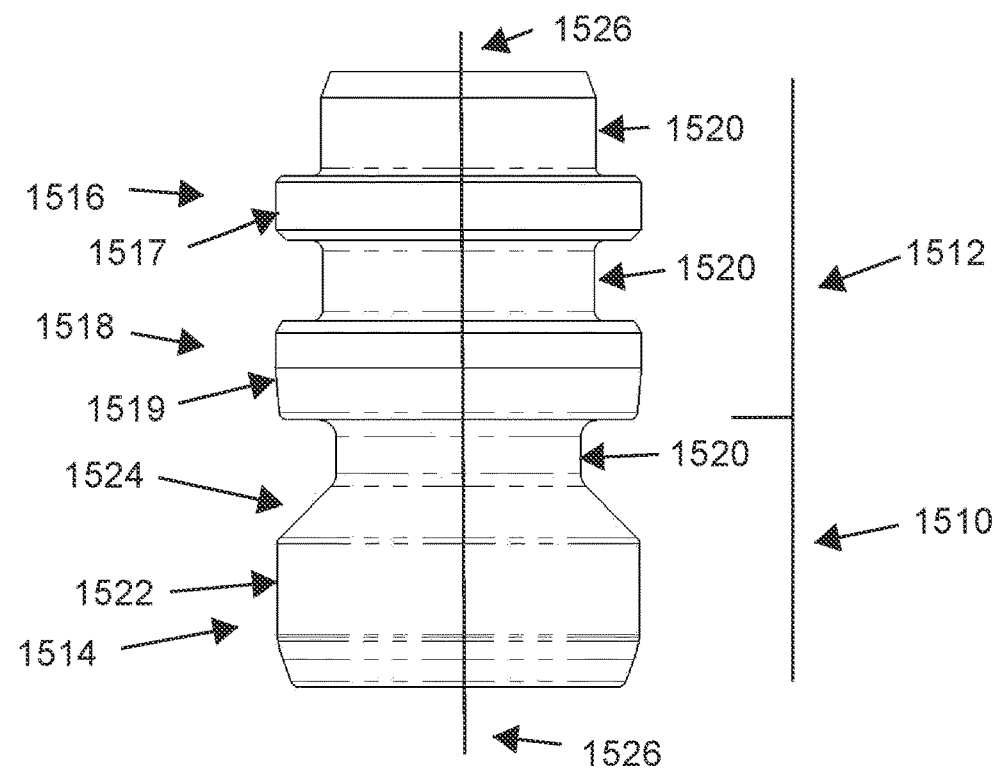
Figure 16A:
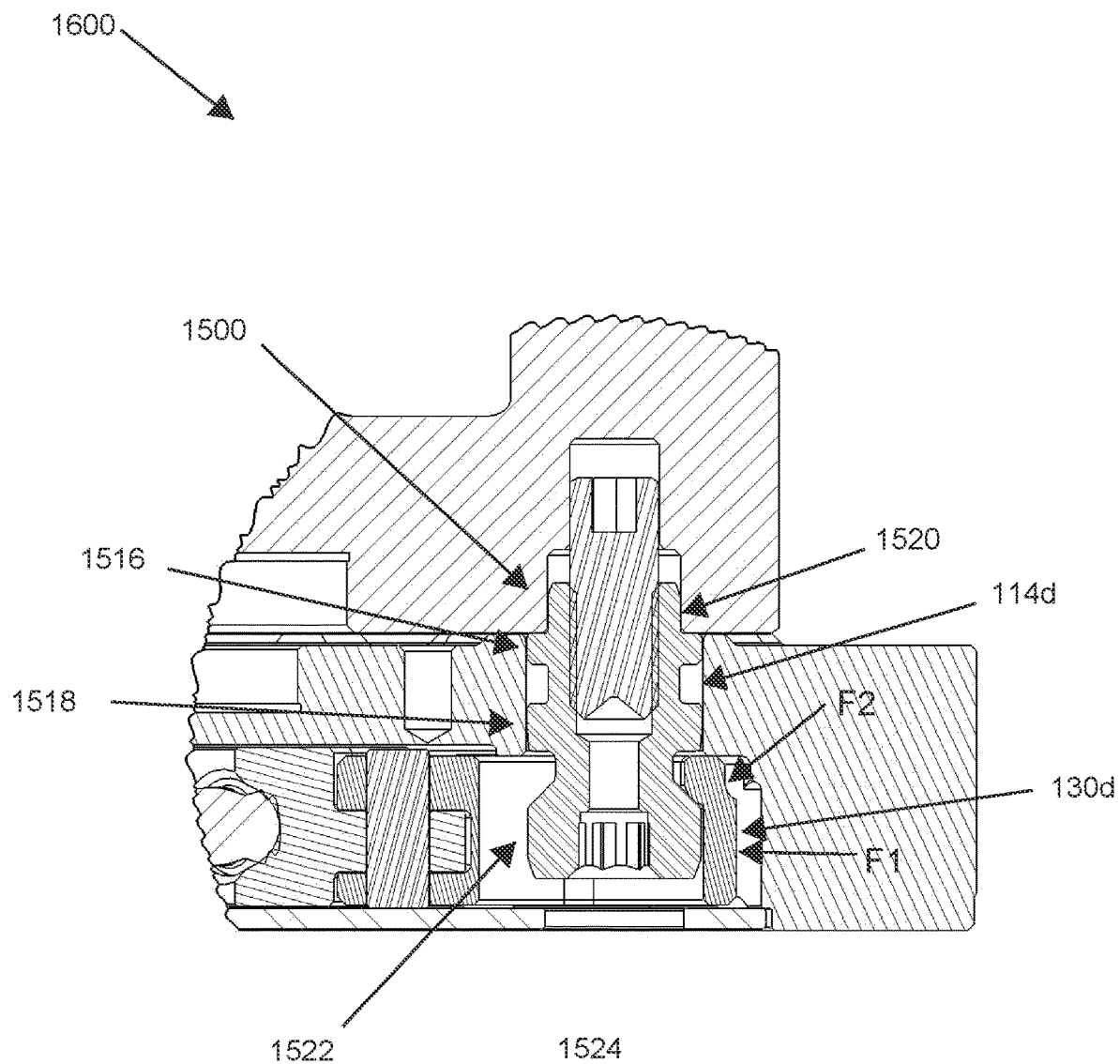
FIG. 16a illustrates is a partial view of one example of the mounting stud of FIG. 15 positioned in a base assembly socket.

FIG. 16 is a side view of the pull stud 1500 illustrated in FIG. 15. The first upper collar 1516 and the second upper collar 1518 extend outward from the center column 1520. The first upper collar 1516 and the second upper collar 1518 each include a flat, cylindrical edge 1517 and 1519 respectively. Reference is also made to FIG. 16a. Cylindrical edge 1517 and cylindrical edge 1519 each contact the walls of a pull stud socket when positioned within a base assembly. The first upper column edge 1517 and second upper column edge 1519 are much wider in diameter than the diameter of the center column 1520. As such, when positioning the pull stud within a base body pull stud socket, the somewhat narrow center column 1520 allows for it to deflect until the pull stud 1500 is positioned within a stud socket and the two upper columns 1516, 1518 contact a precise inner surface of the pull stud socket.

The lower collar 1514 includes a flat, cylindrical edge 1522. A beveled edge 1524 transitions from the lower collar edge 1522 to the center column 1520. The beveled edge 1524 is angled relative to a longitudinal axis 1526 extending through the column 1520. The lower collar portion 1510 along with beveled or angled edge 1524 interact with a corresponding yoke for securely positioning a workpiece on the base assembly. When positioning the pull stud 1500 in a base assembly pull stud socket, the beveled edge 1524 aids in causing a downward force for retaining the pull stud 1500 the socket. Additionally, in one example, the yoke includes an arced and/or beveled gripping surface. The arced and beveled gripping surface of the yoke, which may be conical, provides significantly increased contact area between the gripping member and pull stud versus prior art, resulting in improved holding force while maintaining accurate location of the workpiece.

Figure 17:
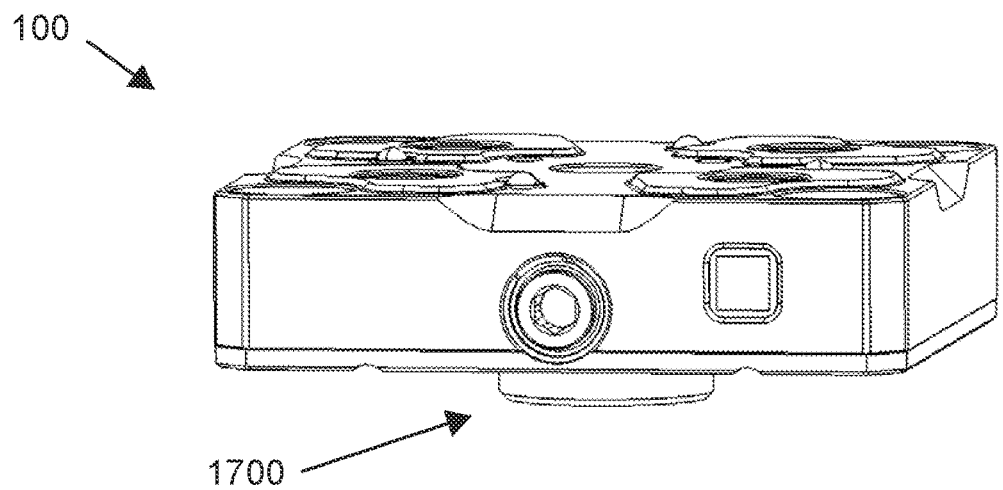
Figure 18:
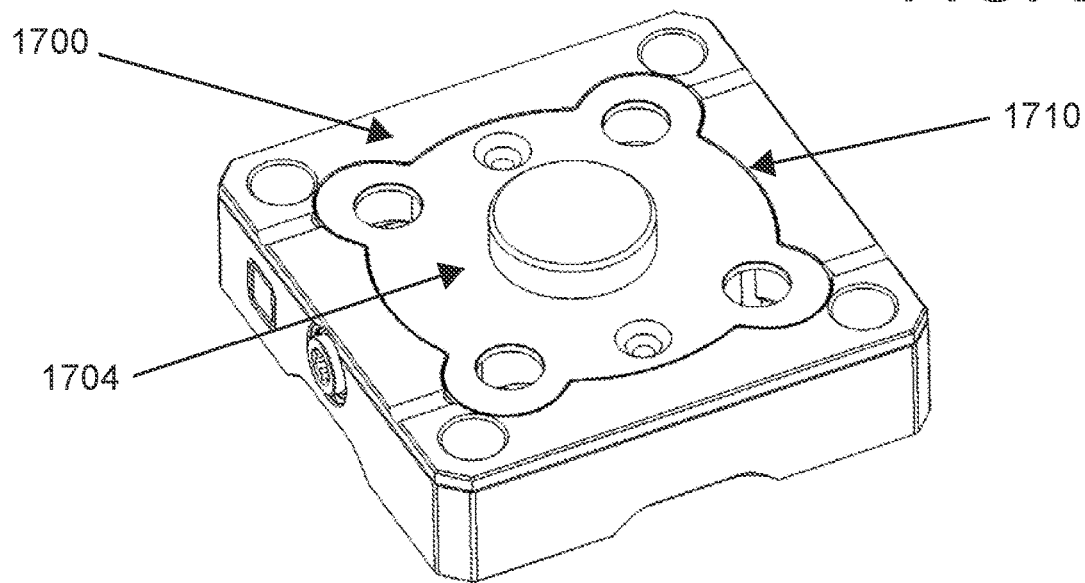
Figure 19:
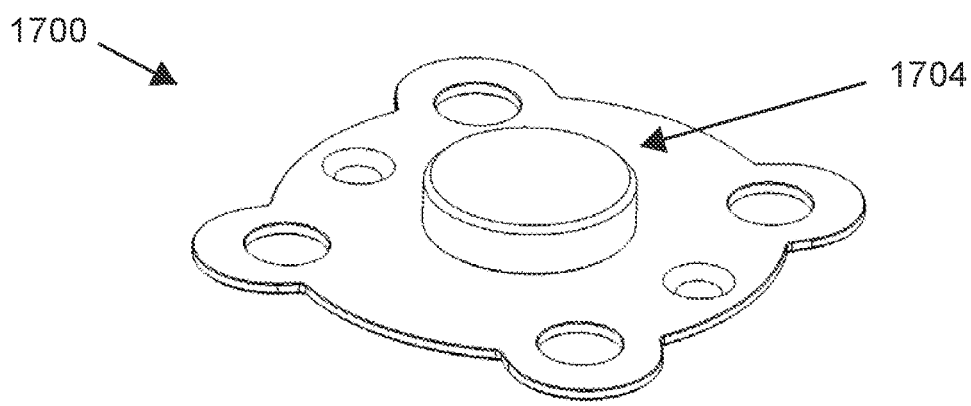

FIGS. 17-19 illustrate one example of an access/service cover plate, illustrated at 1700. Cover plate 1700 is similar to cover plate 106 previously described herein. Cover plate 1700 includes a centering device 1704 for centering and precision locating the tooling base assembly 100 on a work table.

As previously described herein, cover plate 1700 serves as an access or service plate to access the mechanical parts of tooling base assembly 100, including allowing a clamping assembly 104 to float within the base assembly 102. Further, the pocket that cover plate 140 fits into is a precision diameter or slot 1710 within the base assembly 104 base body 110. The cover plate 1700 includes centering device 1704 to aid in precise location and fit of a workpiece on a work table. In one example, the centering device is cylindrically shaped in the form of a spud or puck shape. In other examples, the centering device may be differently shaped. The centering device 1704 may be formed integral the cover plate 1700.

Figure 20:
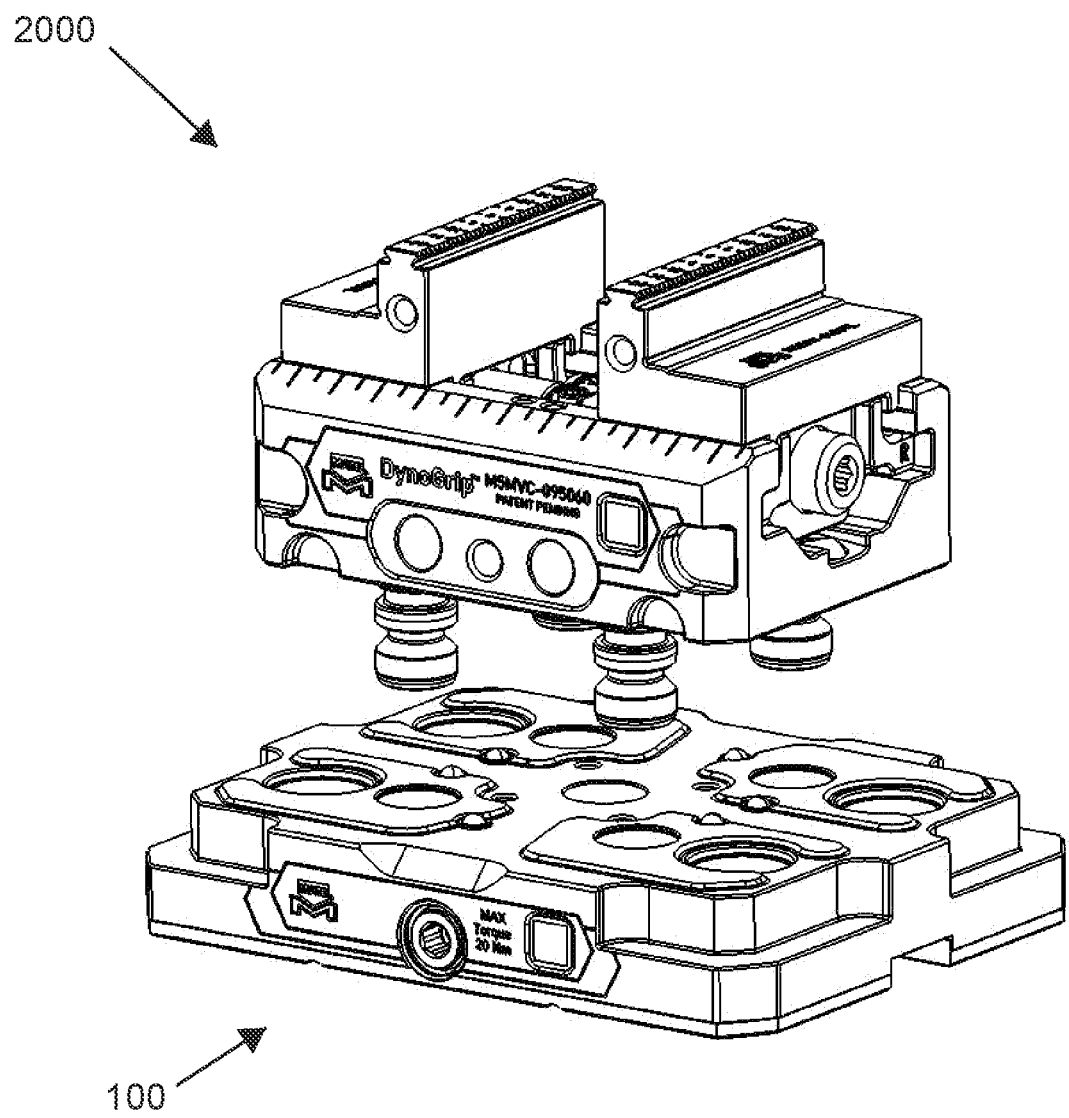

It is recognized that the tooling base assembly detailed herein can be used for precision locating of a number of different workpieces or tools. In one example illustrated in FIG. 20 at 2000, the workpiece is a vise. In other examples, the tooling base assembly is used with other types of workpieces.

It is to be understood that the features of the various exemplary embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. For example, the tooling base assembly may include other advantageous features not detailed herein, such as additional lift systems, centering devices or self-leveling devices. This application is intended to cover any adaptations or variations of the specific embodiments discussed herein. Therefore, it is intended that this invention be limited only by the claims and the equivalents thereof

What is claimed is:

1. A tooling base assembly for holding a workpiece comprising:
    a base assembly; and
    a clamping assembly that imparts an inward radial pulling force towards a center of the base assembly on the workpiece to securely retain and precisely locate the workpiece to the base assembly.

2. The tooling base assembly of claim 1, where the clamping assembly further applies a downward force on the workpiece.

3. The tooling base assembly of claim 1, the clamping assembly comprising a clamping mechanism that provides for outer gripping of a workpiece pull stud located within the base assembly.

4. The tooling base assembly of claim 3, wherein the clamping mechanism includes a yoke.

5. The tooling base assembly of claim 3, the clamping assembly further comprising:
    a pair of pull bars movably coupled to the clamping mechanism; and
    a lead screw operably coupled to the pair of pull bars, where by rotation of the lead screw the clamping mechanism is moved between an open position and a closed position-, and
    where within the clamping assembly the clamping mechanism is located outside of the pair of pull bars.

6. The tooling base assembly of claim 5, where the clamping assembly floats within the base assembly, allowing the clamping assembly to self-adjust balance the clamping load to a workpiece located within the base assembly.

7. The tooling base assembly of claim 1, the base assembly comprising
    a first major surface; and
    one or more contact pads positioned on the first major surface, where when the workpiece is positioned on the base assembly it is in contact with the one or more contact pads.

8. A tooling base assembly comprising:
    a base assembly;
    a clamping assembly that radially grips at least one pull stud located within the base assembly, where the clamping assembly is floatably positioned within the base assembly;
    a lead screw;
    a pair of opposing pull bars operably coupled to the lead screw; and
    the clamping assembly rotatably coupled to the pull bars, where by rotation of the lead screw the clamping assembly moves between an open position and a closed position.

9. The tooling base assembly of claim 8, where the clamping assembly provides for outer gripping of the at least one pull stud.

10. The tooling base assembly of claim 8 comprising a cover plate that retains the clamping assembly within the base assembly.

11. The tooling base assembly of claim 8, the clamping assembly comprising one or more yokes movably coupled to the pull bars.

12. The tooling base assembly of claim 8, where the pair of opposing pull bars comprises a first pull bar and a second pull bar, the first pull bar having a first yoke and a second yoke rotatably coupled to the first pull bar; and the second pull bar having a third yoke and a fourth yoke rotatably coupled to the second pull bar.

13. The tooling base assembly of claim 12, where by rotation of the lead screw, the first pull bar and the second pull bar move in opposing directions along a linear axis relative to a center of the lead screw, causing the first yoke, second yoke, third yoke and fourth yoke to move radially between an open and closed position towards the center of the lead screw.

14. The tooling base assembly of claim 8, the base assembly including a retaining socket aligned with each yoke.

15. The tooling base assembly of claim 8, the lead screw comprising a left hand thread portion, a middle portion, and a right hand thread portion; and where the middle portion is mechanically weaker than the right hand portion and the left hand portion.

16. The tooling base assembly of claim 8, wherein the pull stud comprises:
   a center column;
   a lower collar extending outward from the center column, the lower collar having an angled edge relative to the center column that contacts the clamping assembly resulting in the clamping assembly applying a downward force on the pull stud; and
   at least one upper collar extending outward from the center column that contacts a socket in the base assembly and at least one portion of a center column resiliently flexible to allow precise contact of an upper collar with a base socket surface.

17. The tooling base assembly of claim 16, where at least one portion of the center column is resiliently flexible to provide precise contact of the at least one upper collar with a surface of the socket.

18. A tooling assembly comprising:
   the tooling base assembly of claim 8; and
   a workpiece precision located on the tooling base assembly using the clamping assembly.

19. The assembly of claim 18, where the workpiece is a vise.

* * * * *